US 011701790B2

(12) United States Patent
Myers et al.

(10) Patent No.: US 11,701,790 B2
(45) Date of Patent: Jul. 18, 2023

(54) METHOD AND APPARATUS FOR TURNING PENS

(71) Applicant: Woodpeckers, LLC, Strongsville, OH (US)

(72) Inventors: Matthew A. Myers, Strongsville, OH (US); Jeffery E. Farris, Medina, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 463 days.

(21) Appl. No.: 16/952,693

(22) Filed: Nov. 19, 2020

(65) Prior Publication Data

US 2022/0152863 A1 May 19, 2022

(51) Int. Cl.
*B27C 7/00* (2006.01)
*B27C 7/04* (2006.01)
*B23B 23/02* (2006.01)

(52) U.S. Cl.
CPC .............. *B27C 7/005* (2013.01); *B23B 23/02* (2013.01); *B27C 7/04* (2013.01)

(58) Field of Classification Search
CPC .. B27C 7/02; B27C 7/005; B27C 7/00; B27C 7/04; B23B 23/02; B23B 23/00
See application file for complete search history.

(56) References Cited

U.S. PATENT DOCUMENTS

| | | | |
|---|---|---|---|
| 1,327,445 A | 1/1920 | Rider | |
| 2,433,743 A * | 12/1947 | Dickens | B23B 23/02 340/686.2 |
| 2,619,993 A * | 12/1952 | Lombard, Jr. | B23B 23/00 408/72 R |
| D218,798 S | 9/1970 | Keller | |
| D235,160 S | 5/1975 | Levin | |
| 4,137,822 A | 2/1979 | Behnke | |
| 4,365,460 A | 12/1982 | Cress et al. | |
| 4,559,765 A | 12/1985 | Cress et al. | |
| D296,963 S | 8/1988 | Smallwood | |
| D334,835 S | 4/1993 | Randolph | |
| 5,737,985 A | 4/1998 | Rimlinger, Jr. | |
| D457,899 S | 5/2002 | Nam et al. | |
| 6,840,522 B2 | 1/2005 | Merrifield | |
| D527,750 S | 9/2006 | Prince et al. | |
| D571,835 S | 6/2008 | Concari et al. | |
| D616,275 S | 5/2010 | Kang | |
| D640,298 S | 6/2011 | Launius, Jr. | |
| D696,703 S | 12/2013 | Tsai | |
| D719,990 S | 12/2014 | Manwaring et al. | |
| D937,064 S | 11/2021 | Holub et al. | |
| 2005/0110224 A1 | 5/2005 | Launius, Jr. | |

(Continued)

*Primary Examiner* — Alan Snyder
(74) *Attorney, Agent, or Firm* — Sand, Sebolt & Wernow Co., LPA

(57) ABSTRACT

A complete pen mandrel turning assembly that may allow for simple, accurate, and repeatable centering of a pen mandrel shaft. The presently disclosed system may further include a tail stock assembly that is adjustable to allow the tail stock to be positioned right next to the pen blank to eliminate any chance of runout and other associated problems. Further, the present disclosure may provide a series of precision bushings for use with the pen turning assembly to securely hold a pen blank in the turning assembly while providing an accurate and precise turning reference for the pen turner.

9 Claims, 16 Drawing Sheets

(56) References Cited

U.S. PATENT DOCUMENTS

| | | |
|---|---|---|
| 2007/0187452 A1 | 8/2007 | Budzisz |
| 2008/0042334 A1* | 2/2008 | Zimmermann ........ B43K 5/005 |
| | | 269/287 |
| 2011/0094357 A1* | 4/2011 | Wu ........................ B23B 23/02 |
| | | 82/162 |
| 2019/0029850 A1 | 1/2019 | Keating et al. |

* cited by examiner

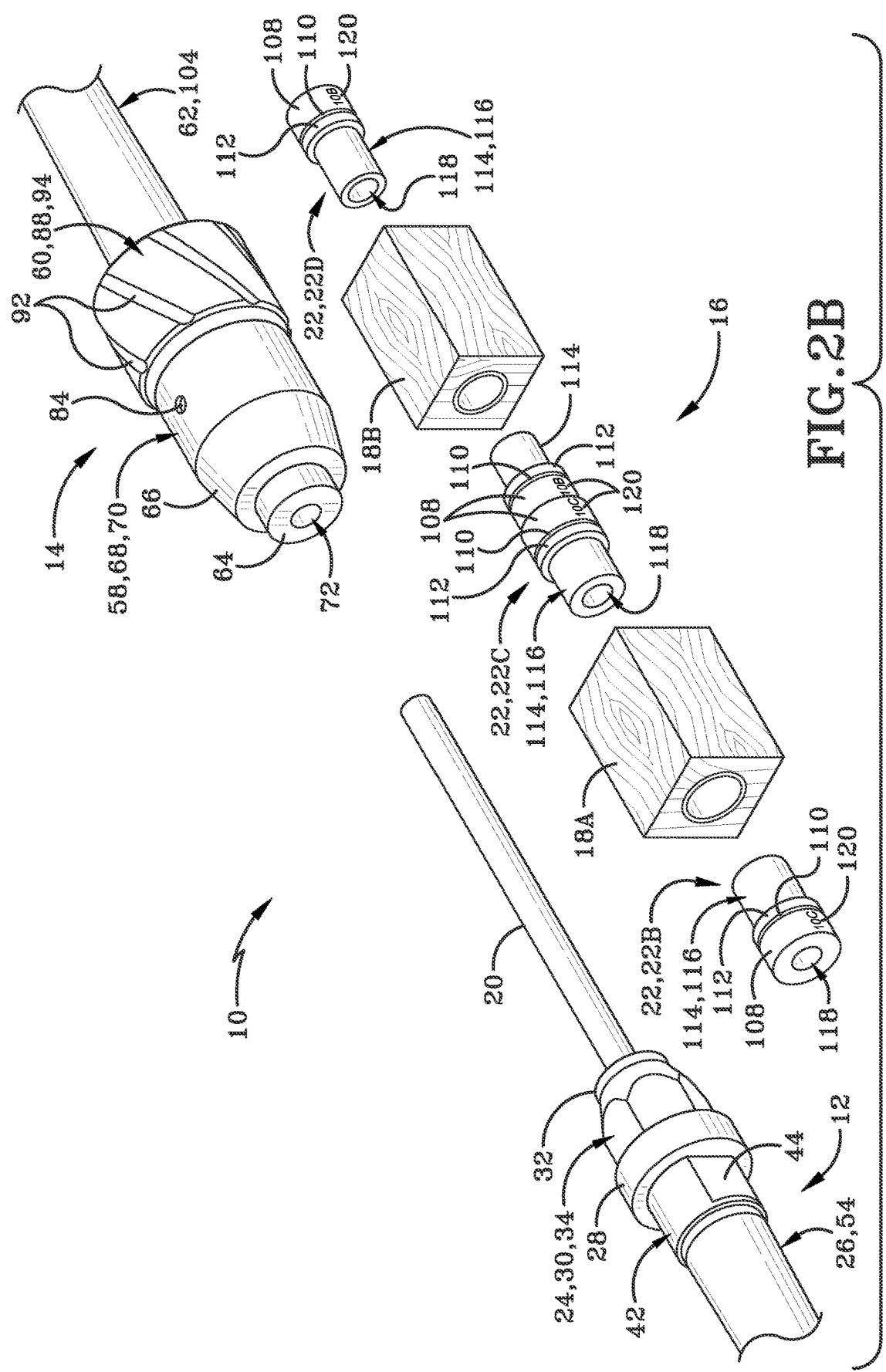

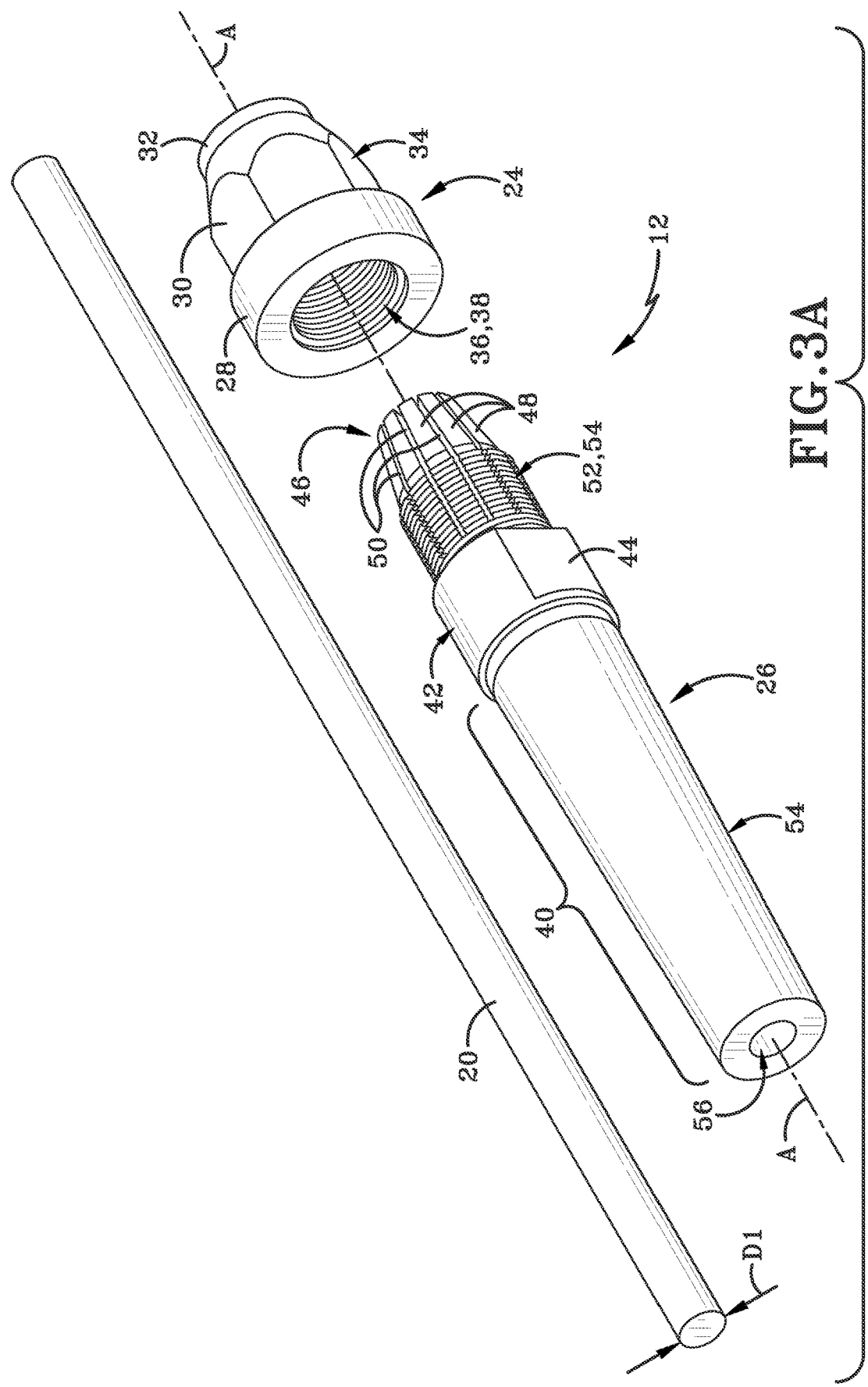

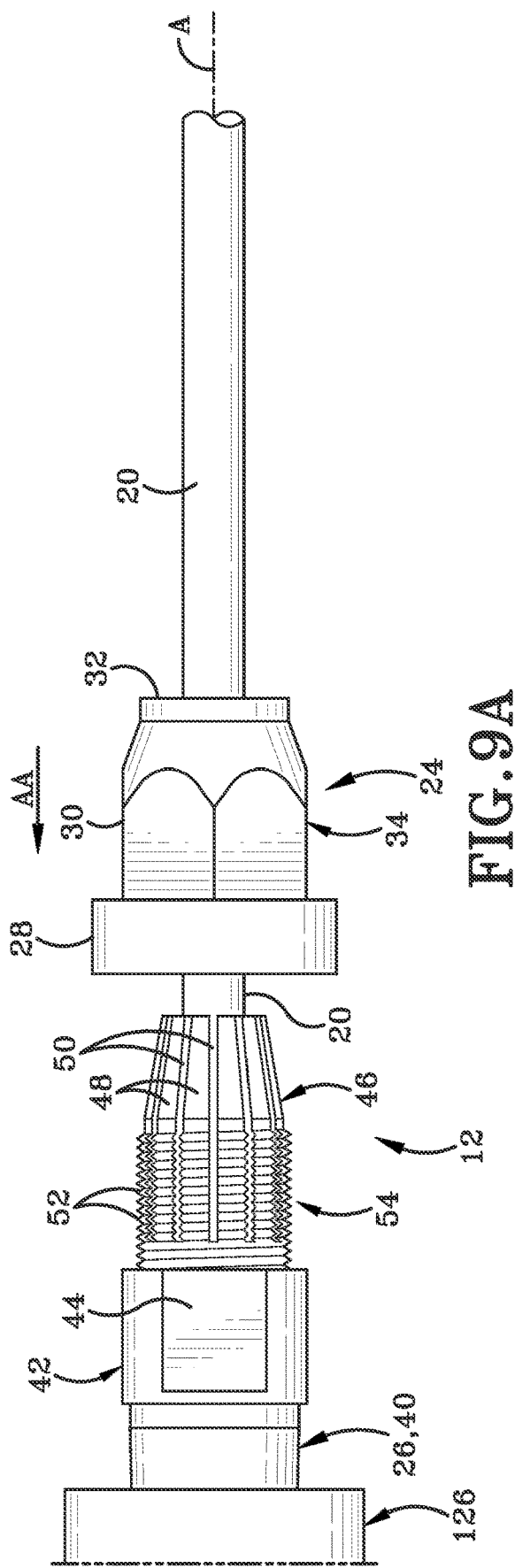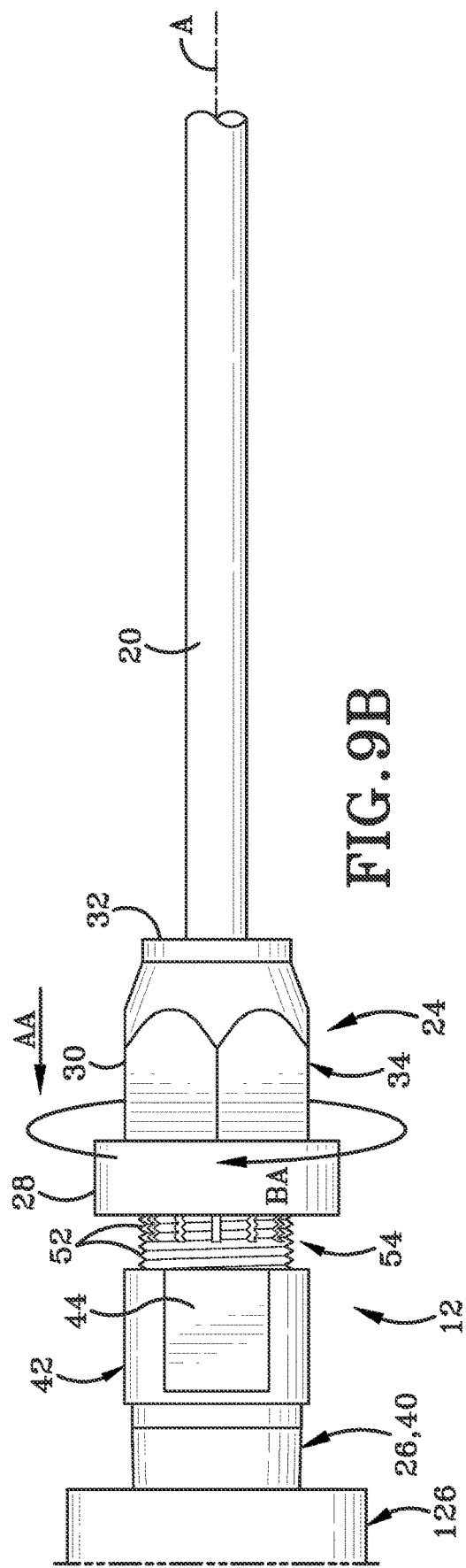

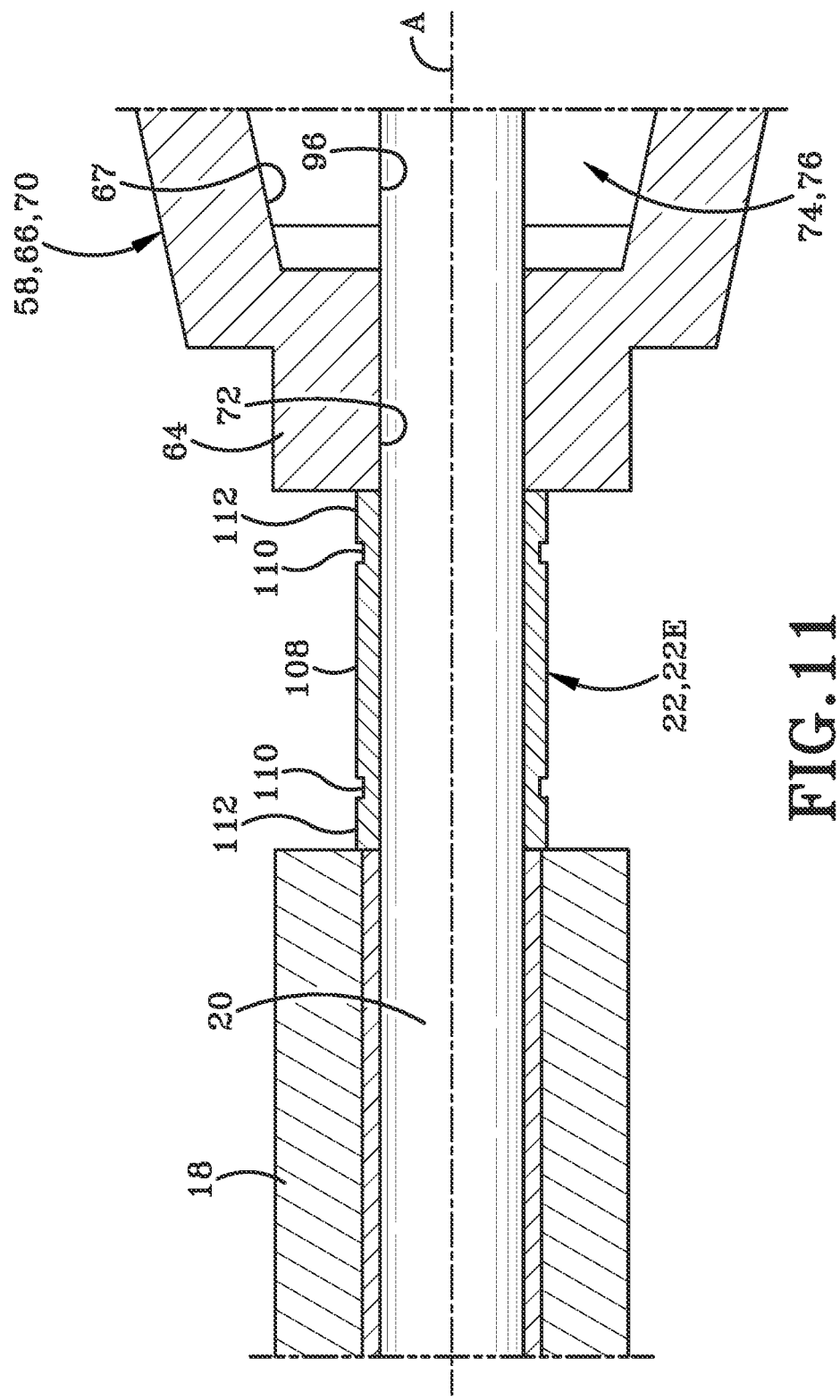

METHOD AND APPARATUS FOR TURNING PENS

TECHNICAL FIELD

The present disclosure relates generally to the field of woodworking and turning tools. More particularly, the present disclosure relates to a wood turning assembly for precision turning of pen blanks. Specifically, the present disclosure relates to a precision pen mandrel wood turning assembly and precision pen turning bushings for use therewith.

BACKGROUND

Making and crafting pens by a process known as pen turning can serve as an excellent introduction to basic spindle turning, or may allow a craftsman to create custom writing utensils for gifts, display, and/or their own use. Pen making typically involves processing a blank prior to turning the blank to form various components of the writing utensil, such as a barrel or a pen cap. Typically, most pen turning is performed using a kit which may provide various pen components including the pen mechanism, clip, brass rings, and the like for assembly along with the writing tip and inkwell. Often, these pen kits further include one or two barrel tubes which are typically made of brass which are inserted into the blanks prior to turning.

Once the pen blanks are assembled, including the barrel tubes, the turning step involves using a lathe and related tools to form the pen blank into the desired pen element such as the barrel or cap. Currently, when turning pen blanks, a specialized turning assembly kit is typically used. This kit commonly includes a pen turning mandrel with the most common pen turning mandrel available being a metal bar that is tapered on one end for connection to a lathe head stock and threaded on the other end to hold a knurled nut.

Further, the presently available turning kits and mandrel shafts are configured as a "one size fits all" system to allow for turning of blanks of any size and configuration. Accordingly, these mandrel shafts are typically longer than the piece that is being created requiring the excess space between the blank and the knurled nut to be taken up with additional spare bushings or the like to secure the pen blank and reduce movement and vibration of the blank. This can lead to further defects or other damage to the pen blank during the turning process.

Therefore, it is difficult, even for highly experienced pen turners, to perfectly center the current pen mandrel shafts on their lathe and even more difficult for beginning pen turners and/or hobbyists to do so. Thus, the current pen mandrel systems often result in damaged and/or wasted pen blanks and materials, and increased time and effort in turning a pen blank for use with a pen kit.

SUMMARY

The present disclosure addresses these and other issues by providing a complete pen mandrel turning assembly that may allow for simple, accurate, and repeatable centering of a pen mandrel shaft. The presently disclosed system may further include a tail stock assembly that is adjustable to allow the tail stock to be positioned right next to the pen blank to eliminate any chance of runout and other associated problems. Further, the present disclosure may provide a series of precision bushings for use with the pen turning assembly to securely hold a pen blank in the turning assembly while providing an accurate and precise turning reference for the pen turner.

In one aspect, an exemplary embodiment of the present disclosure may provide a pen turning assembly comprising: a head stock assembly having a longitudinal through opening defined therethrough; a tail stock assembly having a longitudinal through opening defined therethrough; a mandrel shaft extending between the head stock assembly and the tail stock assembly wherein at least a portion of the mandrel shaft extends into the longitudinal through opening defined through the head stock assembly and into the longitudinal through opening defined through the tail stock assembly; and at least one bushing slidably engaged with the mandrel shaft between the head stock assembly and the tail stock assembly having a body and at least one wear indicator groove defined therein.

In another aspect, an exemplary embodiment of the present disclosure may provide a method of turning a blank comprising: inserting a body of a head stock assembly into a head stock of a lathe; inserting at least a portion of a mandrel shaft into a through opening defined in the head stock assembly; securing the portion of the mandrel shaft within the head stock assembly in place with a collet formed from a front portion of the head stock assembly body and a cap threadably engaged therewith; positioning a first bushing on the mandrel shaft with a head thereof abutting the cap of the head stock assembly; engaging a blank with a body of the first bushing; positioning a second bushing on the mandrel shaft with a body thereof engaged with the blank opposite the first bushing; moving a tail stock assembly engaged with a tail stock of the lathe from a first position wherein the mandrel shaft is exterior of a through opening defined in the tail stock assembly to a second position wherein at least a portion of the mandrel shaft is inserted within the through opening defined in the tail stock assembly and a nose cone of the tail stock assembly is abutting a body of the second bushing; securing the portion of the mandrel shaft within the tail stock assembly in place with a collet formed from a front portion of a bearing assembly of the tail stock assembly and the nose cone of the tail stock assembly; rotating the turning assembly with the lathe; and turning the blank with at least one lathe tool.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2B is a top left isometric prospective exploded view of a turning assembly configured for turning two blanks according to one aspect of the present disclosure.

FIG. 3A is a top left isometric prospective exploded view of a head stock assembly and mandrel shaft of a turning assembly according to one aspect of the present disclosure.

FIG. 9A is a front elevation operational view of a turning assembly showing a first step in the assemblage thereof according to one aspect of the present disclosure.

FIG. 9B is a front elevation operational view of a turning assembly showing an intermediate step in the assemblage thereof according to one aspect of the present disclosure.

FIG. 10A is a front elevation cross sectional view of the head stock side of a fully assembled turning assembly according to one aspect of the present disclosure.

FIG. 11 is an enlarged front elevation cross sectional view of the fifth embodiment of a bushing as installed on the tail stock side of a turning assembly according to one aspect of the present disclosure.

Similar numbers refer to similar parts throughout the drawings.

DETAILED DESCRIPTION

Figure 1A:
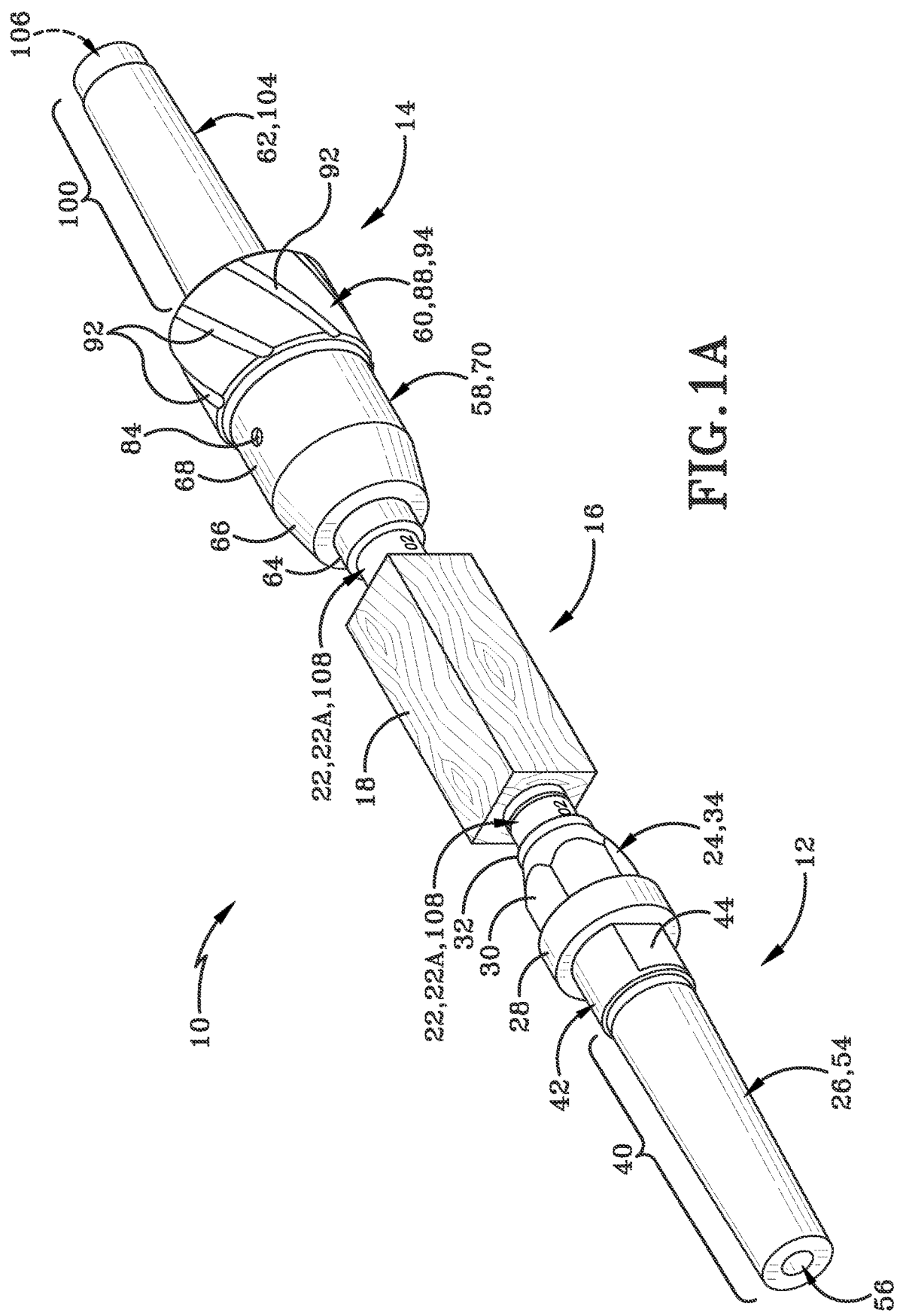
FIG. 1A is a top left isometric prospective view of a turning assembly configured for turning a single blank according to one aspect of the present disclosure.

As used herein, the term turning will be understood to refer to the mechanical process of shaping and/or finishing an object by rotating the object in a lathe with one or more cutting tools, also referred to herein as lathe tools. As further used herein, turning is contemplated to include both shaping the object and finishing the object.

With reference to FIGS. 1A-2B, a pen mandrel turning assembly is shown and generally indicated at reference 10 and hereinafter referred to simply as turning assembly 10. Turning assembly 10 may include a head stock assembly 12, a tail stock assembly 14, and a turning section 16. Turning assembly 10 may be utilized with one or more blanks 18 situated in the turning section 16 about an enclosed mandrel shaft 20 and separated from head stock assembly 12 and/or tail stock assembly 14 by one or more bushings 22 (and/or between blanks such as blanks 18A and 18B as seen in FIG. 1B).

With reference to FIG. 3A, the head stock assembly 12 is shown and will now be described in more detail. Head stock assembly 12 may include a drive center cone, referred to as cap 24, and a drive center, referred to as body 26. Cap 24 and body 26 of head stock assembly 12 may be constructed of any suitable material including, but not limited to, steel, aluminum, or other metals, or the like. Cap 24 and body 26 of head stock assembly 12 may further be configured for use within the head stock (e.g. head stock 126—best seen in FIGS. 9A-9E, 12A and 12B) of a lathe using standard taper connections, such as a #2 Morse taper, or the like. According to one aspect, head stock assembly 12 may be configured for mating with the head stock of a lathe having a standard Morse taper of any suitable size. According to another aspect, the head stock assembly 12 may be configured for any suitable taper-type and/or configuration of standard lathe head stocks. According to yet another aspect, head stock assembly 12 may be configured and sized to engage the head stock of any suitable lathe.

Cap 24 of head stock assembly 12 may include a collar 28, which may sit adjacent collar 42 of body 26 when assembled, as discussed further herein. According to one aspect, collar 28 may be knurled or textured to facilitate the gripping thereof. Cap 24 may further include a nut portion 30, which may consist of one or more substantially flat faces on the exterior 34 of cap 24, which may allow for engageable interaction with a wrench or other similar tool for tightening cap 24 on body 26, as discussed below. Cap 24 may further include a tip 32, which may define a forward end of head stock assembly 12, which may be the end adjacent or nearest to the turning section 16. Tip 32 may have a through opening 33 defined therein that is in communication with interior 36 of cap, as discussed below.

Cap 24 may have an exterior 34, which may generally define an exterior surface thereof and may include the collar 28, nut portion 30, and tip 32, and an interior 36, which may be sized and configured to accept the front portion 46 of body 26 therein as described below. The interior 36 of cap 24 may include a series of internal threads 38, which may allow for threadable engagement with front portion 46 of body 26 as discussed herein. The interior 36 of cap 24, along with opening 33, may further define a through opening through the entire body of cap 24, through which the mandrel shaft 20 may extend during assembly and use, as discussed further below. The interior 36 of cap may be sized to allow insertion of a collet that defines the front portion 46 of body 26, and may have tapered interior surface (best seen in FIG. 10A at reference 31) configured to provide pressure on the arms 48 of collet formed by front portion 46 to interact with mandrel shaft 20, as described further herein.

Body 26 of head stock assembly 12 may include a rear portion 40 which may be the portion of body 26 that is tapered and configured to fit within the head stock of a lathe. According to one example, this tapered rear portion 40 may be tapered to fit a #2 Morse taper head stock, as mentioned above. Body 26 may further include a collar 42, which may sit adjacent collar 28 of cap 24 when head stock assembly 12 is assembled. Collar 42 may further define the maximum limit to which cap 24 may be installed on front portion 46 thereof. As with cap 24, collar 42 may include one or more substantially flat surfaces 44 which may engage a wrench or other similar tool to assist in tightening head stock assembly 12 during assembly.

Front portion 46 of body 26, which again is understood to be the portion closest to turning section 16 of turning assembly 10, may be sized and configured to fit within interior 36 of cap 24. As mentioned previously herein, front portion 46 may form or define a collet, which may provide a gripping or tightened hold on mandrel shaft 20 when inserted therein and when cap 24 is threadbly engaged therewith. Specifically, front portion 46 may have a series of alternating arms 48 and slots 50 forming the multi-section collet. According to one aspect, front portion 46 maybe a 12 section collet. According to another aspect, front portion 46 may be a collet having any suitable number and sized sections to effectively grip or hold mandrel shaft 20 in place when head stock assembly is fully assembled. Front portion 46 may further include external threads 52 for threadable engagement with internal threads 38 of cap 24.

As with cap 24, body 26 may have an exterior 54, which may generally define the exterior surface of body 26, including all elements thereof, and an interior 56, which may further define a through opening sized and configured for slidable engagement with mandrel shaft 20 therein, as discussed further below.

Mandrel shaft 20 may be a concentrically ground and polished rod that may be cylindrical having an outside diameter D1, as shown in FIG. 3A, that is sized to fit within turning assembly 10, as discussed herein. Accordingly, mandrel shaft 20 ay define an axis, shown in the figures as Axis A, which may be the longitudinal axis of mandrel shaft 20. Axis A may extend longitudinally through the entirety of turning assembly 10 and may define a rotational Axis About which all of turning assembly 10 may rotate when engaged and operated with an associated lathe, as discussed further herein. Axis A may also represent the center of mandrel shaft 20 and turning assembly 10.

Mandrel shaft 20 may be formed of any suitable material, including, but not limited to, 4140 chromoly steel, other similar metals and/or alloys, or the like, as dictated by the desired implementation. Mandrel shaft 20 may be precision ground and polished and may be free of any threading or texture across its entire length, thus eliminating the need for a threaded nut on the tail stock end thereof, as discussed below.

Figure 3B:
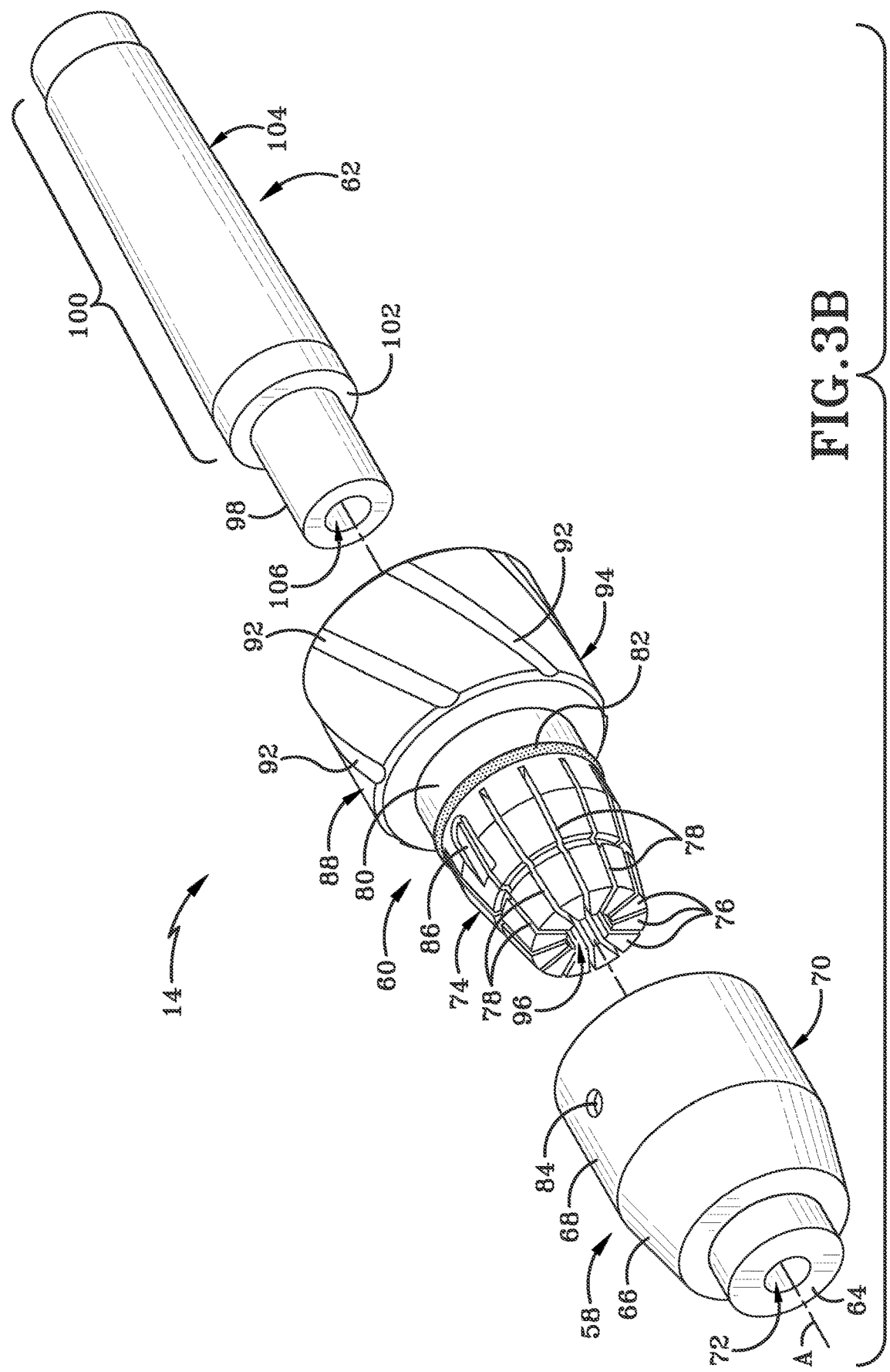
FIG. 3B is a top left isometric prospective exploded view of a tail stock assembly of a turning assembly according to one aspect of the present disclosure.

With reference now to FIG. 3B, the tail stock assembly 14 will now be discussed. Tail stock assembly 14 may include a nose cone 58, a bearing assembly 60, and a live center, referred to as body 62. Nose cone 58 may be the forward-most portion of tail stock assembly, i.e. the portion closest to the turning section 16 of turning assembly 10. Nose cone 58 may include a tip 64, which may be the surface oriented towards the turning section 16 and opposite the tip 32 of cap 24 of head stock assembly 12. Nose cone 58 may further include a tapered portion 66 and a base 68, and may be configured for slidable engagement with a front portion 74 of bearing assembly 60, as discussed further below. Nose cone 58 may have an exterior 70, which may generally define the outermost surfaces of nose cone 58, including all elements thereof, and an interior 72, which may define a through opening and may be sized and configured for slidable engagement with front portion 74 of bearing assembly 60. Interior 72 may have a tapered surface (best seen in FIG. 10B as surface 67) that may be sized and configured to put pressure on the collet defined by front portion 74 of bearing assembly, as discussed below.

Accordingly, bearing assembly 60 may have a front portion 74, which, similar to front portion 46 of body 26, may be configured with a series of alternating arms 76 and slots 78 as to form a collet for grippable engagement with mandrel shaft 20, as discussed further herein. Front portion 74 may further include a base 80 with a locking O-ring 82 engaged therewith for securing nose cone 58 thereon when tail stock assembly 14 is fully assembled. O-ring 82 may provide a friction surface, which may prevent or otherwise discourage both disengagement of nose cone 58 from front portion 74 as well as rotation of nose cone 58 during operation of the lathe and use of turning assembly 10. Front portion 74 may further include a center align surface 86, which may interact with a nose cone pin 84 disposed through the base 68 of nose cone 58 for proper alignment of nose cone 58 and front portion 74 when assembling tail stock assembly 14.

Figure 10:
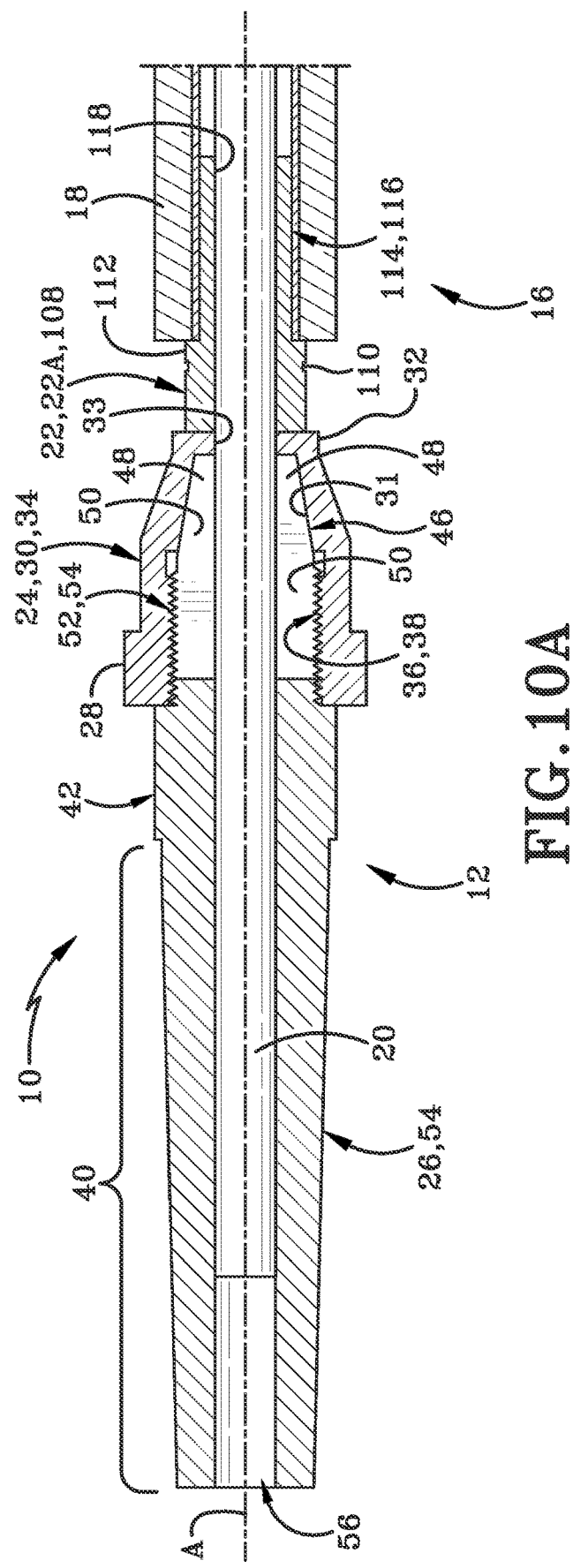
FIG. 10 is a diagrammatic view indicating that the front elevation cross sectional views of FIG. 10A and FIG. 10B should be arranged in landscape orientation side-by-side to reveal an enlarged vertical cross sectional view of a turning assembly according to one aspect of the present disclosure.
Figure 10B:
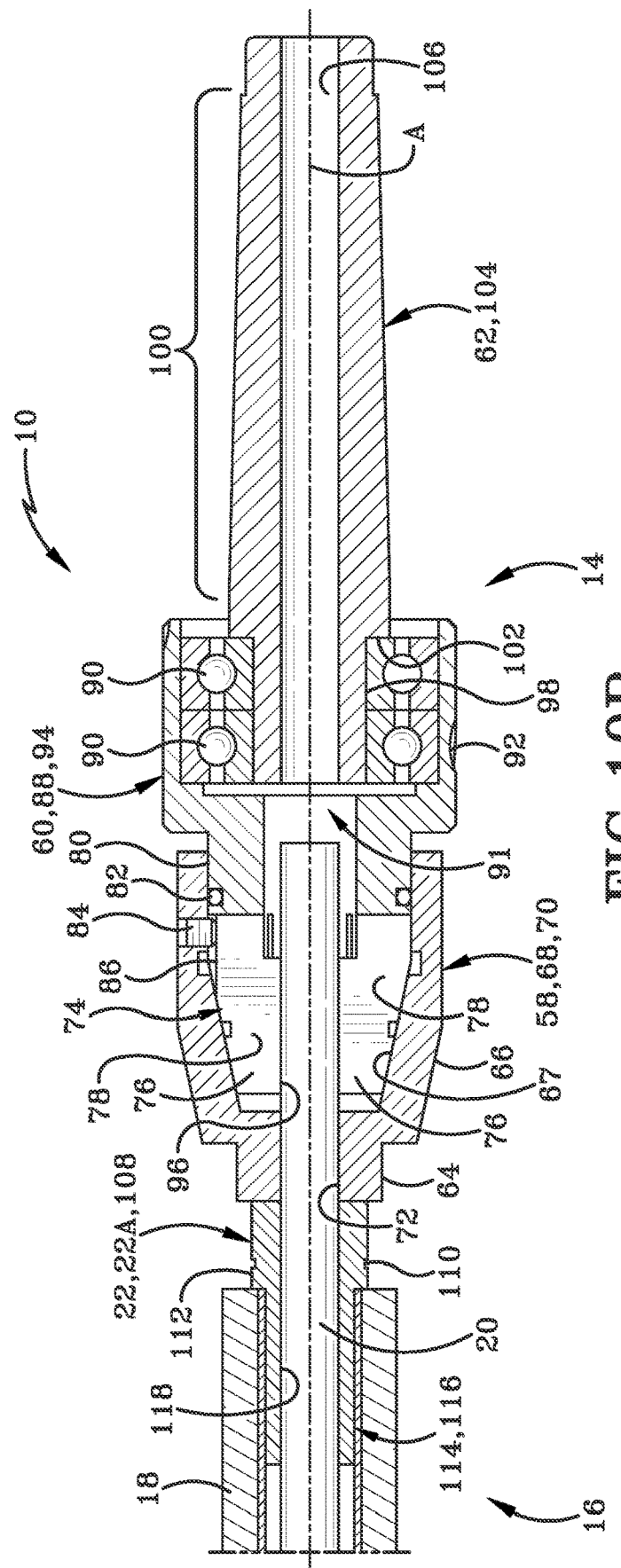
FIG. 10B is a front elevation cross sectional view of the tail stock side of a fully assembled turning assembly according to one aspect of the present disclosure.

Bearing assembly 60 may further include a bearing housing 88, which may house a series of ball bearings 90 (best seen in FIG. 10B), which may be arranged about an internal hub assembly 91 (FIG. 10B). Bearing housing 88, bearings 90, and hub assembly 91 may allow rotational movement of bearing assembly 60 about the longitudinal Axis A defined by mandrel shaft 20.

Bearing assembly 60 may further include a series of angled channels 92 defined in an exterior 94 surface thereof. More particularly, angled channels 92 may be spaced and disposed about the exterior of bearing housing 88 and may be operable to direct airflow towards the lathe tools 130 when in use, as discussed further below. As with other components described herein, exterior 94 of bearing assembly 60 may generally define the exterior surface of bearing assembly 60, including all components thereof. Bearing assembly 60 may further include an interior 96, which may define a through opening sized and configured to accept mandrel shaft 20 therein, and further sized and configured to accept front portion 98 of body 62 therein, as discussed below.

Body 62 of tail stock assembly 14 may include a front portion 98 sized and configured to engage the interior 96 of bearing assembly 60. Body 62 may further include a rear portion 100, which, similar to rear portion 40 of head stock assembly 12, may be tapered for engagement with the tail stock (such as tail stock 128 in FIGS. 9D, 9E, 12A, and 12B) of an associated lathe. According to one aspect, rear portion 120 may be configured and tapered to fit a standard #2 Morse taper. According to another aspect, rear portion 100 may be tapered and configured to engage with any suitably configured tail stock of an associated lathe. At the transition from front portion 98 to rear portion 100 may be a stop face 102, which may define a surface for engagement with bearing assembly 60 to prevent over insertion of front portion 98 into the interior 96 of bearing assembly 60 to further prevent damage or unnecessary friction against bearings 90 and bearing housing 88. As with other components described herein, body 62 may have an exterior 104 generally defining the exterior surface of the components thereof and an interior 106, which again may define a through opening sized and configured to accept mandrel shaft 20 therein, as discussed further below.

Turning section 16 of turning assembly 10 may generally be defined as the space between the tip 32 of cap 24 and the tip 64 of nose cone 58. When fully assembled, turning section 16 is understood to include blanks 18 and bushings 22, along with a portion of mandrel shaft 20 extending therethrough, as discussed further herein. Put another way, turning section 16 is the area where the object to be turned is secured when turning assembly 10 is in use.

Figure 1B:
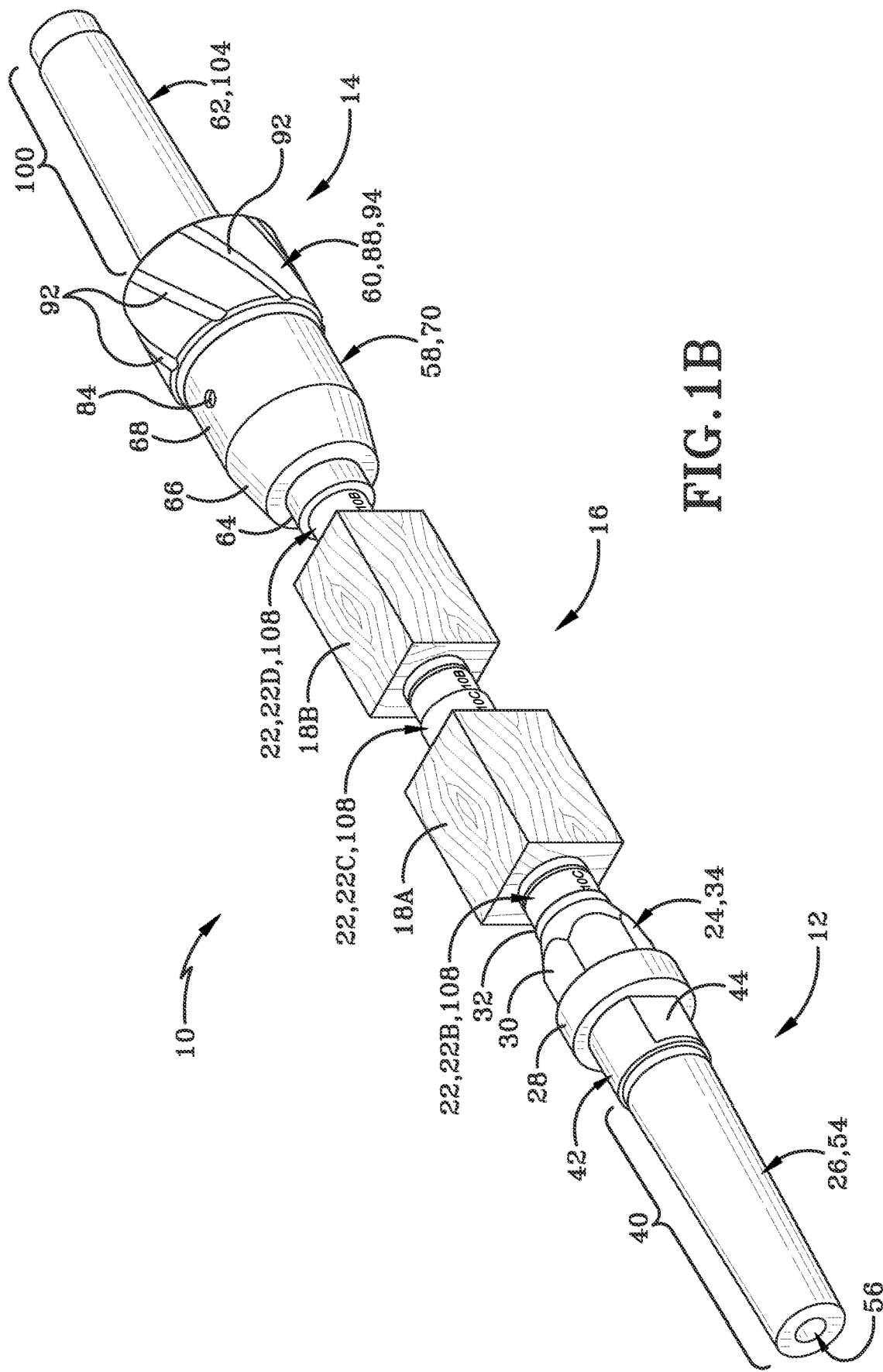
FIG. 1B is a top left isometric prospective view of a turning assembly configured for turning two blanks according to one aspect of the present disclosure.
Figure 2A:
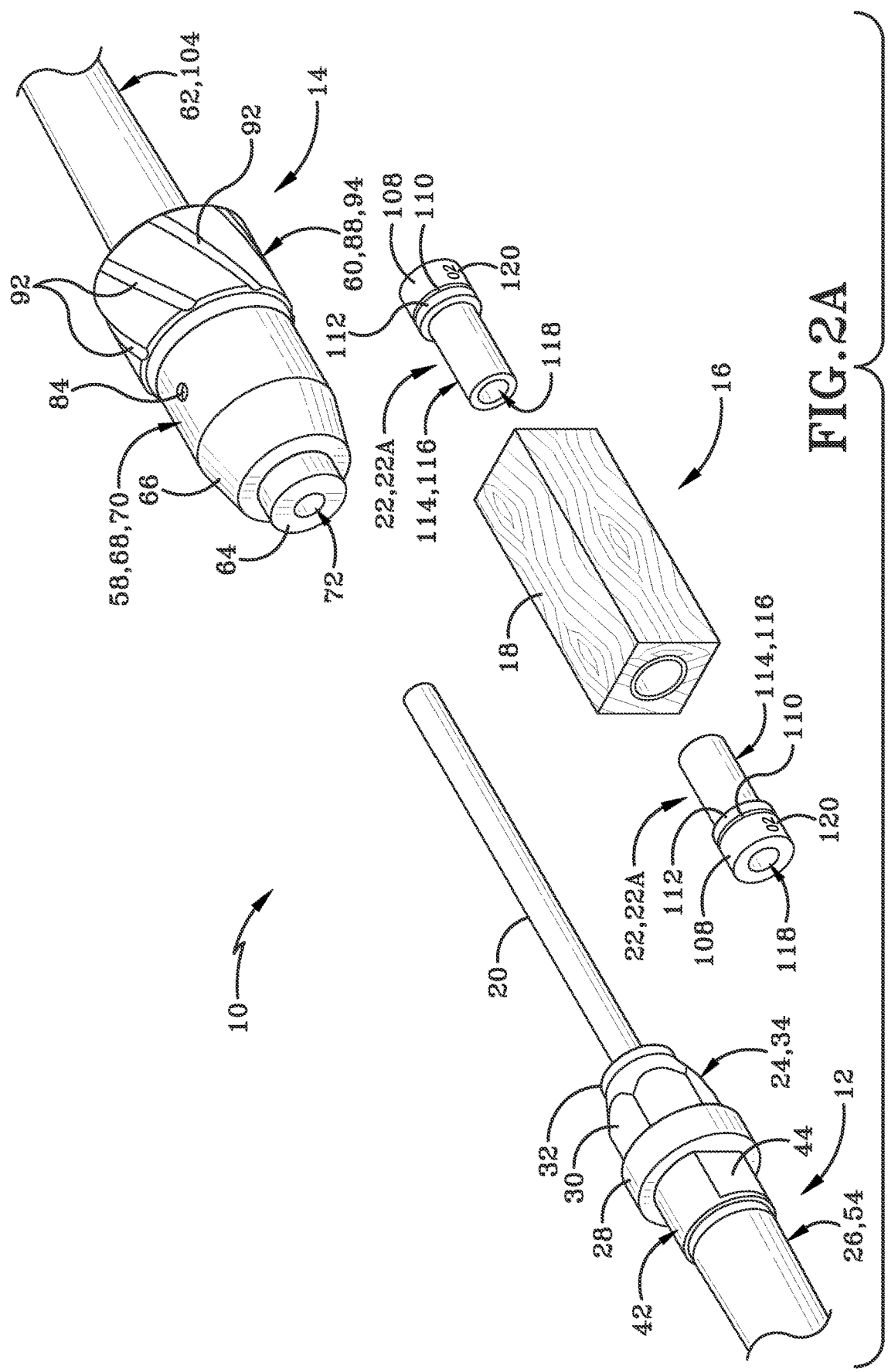
FIG. 2A is a top left isometric prospective exploded view of a turning assembly configured for turning a single blank according to one aspect of the present disclosure.

Blanks 18 may be any suitable pen blanks formed of any suitable material including, but not limited to, wood, acrylic, plastic or other polymers and may be provided with or acquired separately from pen turning kits and/or turning assembly 10. As discussed herein, blanks 18, including blanks 18A and 18B, are contemplated to have been previously drilled and have a barrel tube inserted therein for proper engagement with mandrel shaft 20 for effective turning thereof, as described below. Accordingly, it will be understood that when fully assembled, as best seen in FIG. 1A and FIG. 1B, blanks 18 will extend longitudinally through the turning section 16 of turning assembly 10 and will be held in place by the interaction between bushings 22 and the head stock and tail stock assemblies 12 and 14, as discussed further below.

With reference to FIGS. 4-8, several exemplary embodiments of bushings 22 will be shown and described. It will be understood that the bushings 22 shown and described herein are representative examples, and are not limiting examples thereof. Bushings 22 may have additional sizes and configurations depending on the dimensions, type, style, or operating mechanism of the pen or pencil being created. It will therefore be further understood that bushings other than those described herein may be used with turning assembly 10 as dictated by the desired implementation. Accordingly, reference numbers used in describing bushings 22 may be the same and refer to similar structures, unless specifically stated otherwise. In general, bushings 22 may include one or more heads 108, one or more wear indicator grooves 110 defined therein that may generally define a low end turning tolerance for bushings 22, one or more wear rings 112, and one or more bodies 114. Bushings 22 may further have an exterior generally defining the exterior thereof, including all components of the bushing 22, and an interior 118 defining a through opening therein, sized to engage mandrel shaft 20, as discussed below. Bushings 22 may further include one or more engravings 120 to provide reference information about the particular bushing 22 (such as size, placement, kit compatibility, or other similar information). As illustrated herein as a non-limiting example, engravings 120 may indicate compatibility with common commercially available pen/pencil kits and/or pen/pencil styles.

Bushings 22 may be constructed of any suitable material and may be concentrically ground and polished to have specific turning tolerances and to provide slidable engagement with mandrel shaft 20, while minimizing any space or play between bushings 22 and mandrel shaft 20. According to one aspect, bushings 22 may be constructed of 4140 chromoly steel. According to another aspect, bushings 22 may be formed of other metals or alloys as dictated by the desired implementation.

Figure 4:
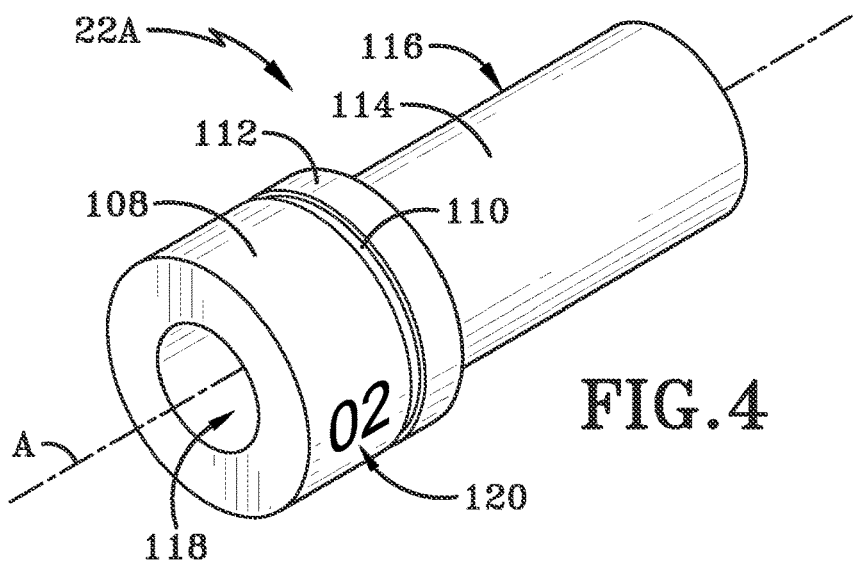
FIG. 4 is a top left isometric prospective view of a first embodiment of a bushing for a turning assembly according to one aspect of the present disclosure.
Figure 5:
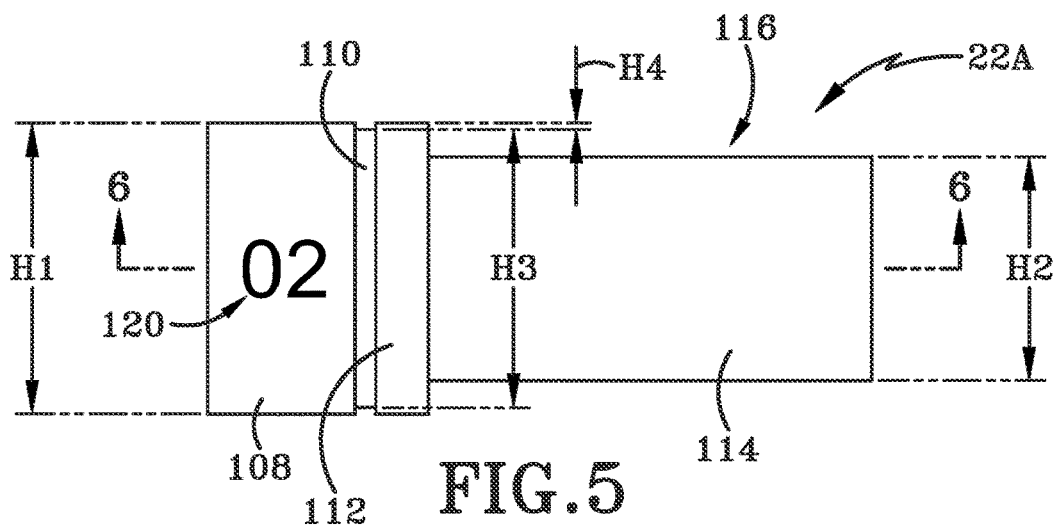
FIG. 5 is a front elevation plan view of a first embodiment of a bushing for a turning assembly according to one aspect of the present disclosure.
Figure 6:
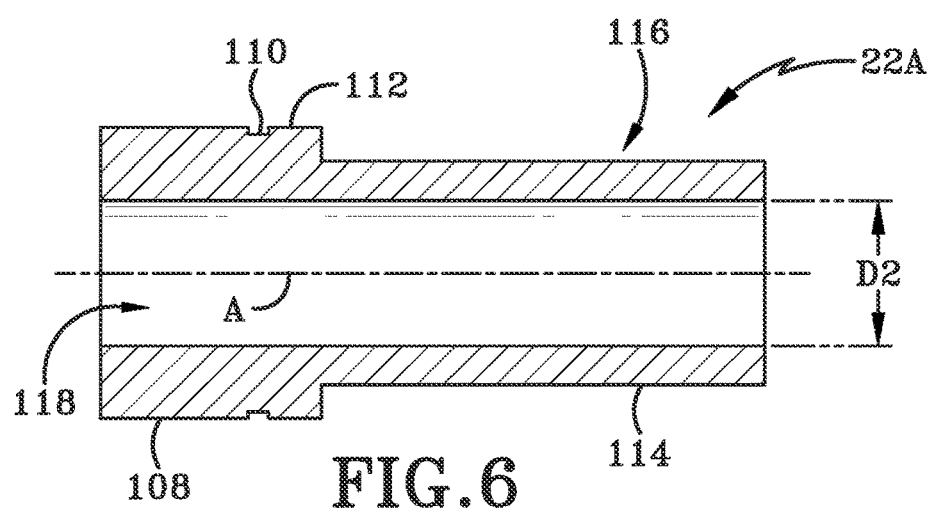
FIG. 6 is a front elevation cross section view of a first embodiment of a bushing for a turning assembly looking in the direction of line 6-6 identified in FIG. 5 according to one aspect of the present disclosure.

As seen in FIGS. 4-6, a first style of bushing 22A may be a one-sided bushing, which may be utilized between one of the head stock 12 or tail stock 14 and a blank 18 to be turned. One-sided bushings 22A may have a singular head 108 and body 114 extending therefrom. Head 108 may further include a single wear indicator groove 110 and a single wear ring 112, which may abut a blank 18 during the turning process as discussed below. One-sided bushing 22A, as shown in FIGS. 4-6, may be sized and configured for use with a single blank 18 (as best seen in FIG. 1A).

With reference to FIG. 5, one-sided bushing 22A may have a first height H1, which may be the height and/or outer diameter of head 108 while body 114 may have a second height H2, which may also correspond to the outer diameter thereof and which may be less than height H1 as shown therein. Wear indicator groove 110 may have a height H3, intermediate between height H1 and H2, and which may define the low end turning tolerance for bushing 22A. The difference between height H1 of body 108 and height H3 of wear indicator groove 110 is shown and indicated as height H4, which may define the thickness of wear ring 112 and may further define the amount that may be worn away before the bushing 22 is no longer sufficient for turning a blank 18 and may be discarded, as discussed further herein.

With reference to FIG. 6, despite the different external heights H1-H4 of bushing 22A, the interior through opening 118 thereof may have a consistent height or diameter, indicated as diameter D2 in FIG. 6, which may be sized for slidable engagement with mandrel shaft 20 having outer diameter D1. Similarly, although not shown, the interior of head stock assembly 12 and tail stock assembly 14 components may likewise have an interior diameter that is approximately equal to D2 where such components are engaged with mandrel shaft 20. It will be therefore understood that while other components of turning assembly may have a larger internal diameter than D2 in areas not engaged with mandrel shaft 20, only the collets formed by front portions 46 and 74 of head stock and tail stock assemblies 12 and 14 may have a smaller internal diameter than diameter D2. The remaining components have an internal diameter of at least D2 as to permit slidable engagement of mandrel shaft 20 therethrough, as discussed below with reference to the assembly of turning assembly 10.

Figure 7:
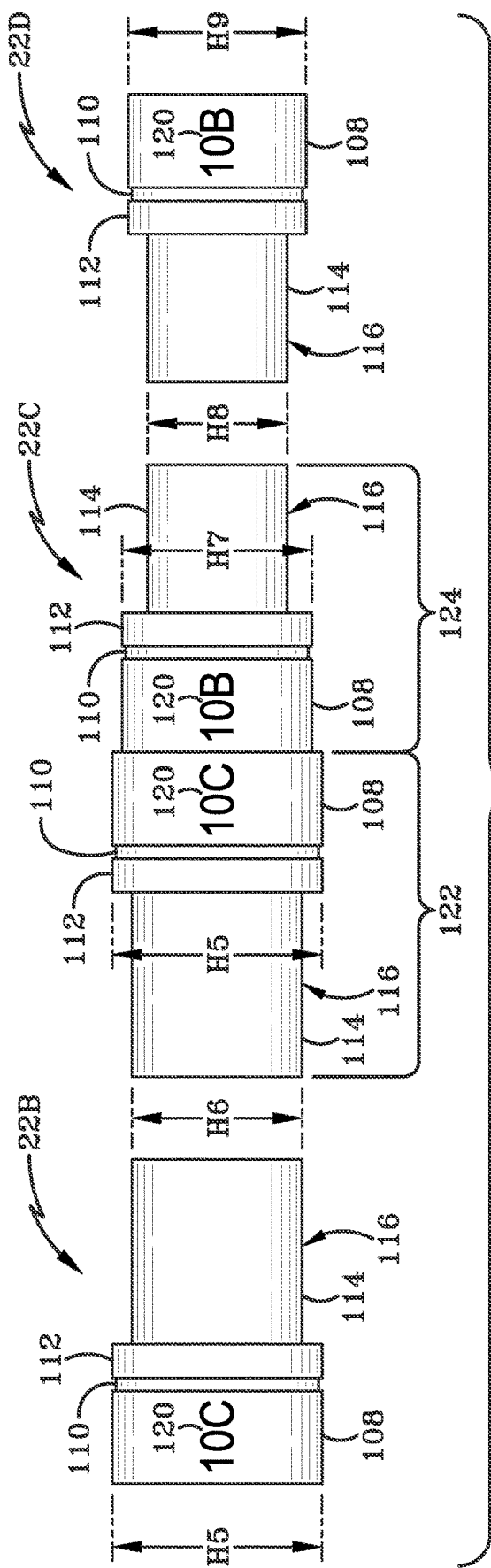
FIG. 7 is a front elevation plan view of a second, third, and fourth embodiment of bushings for a turning assembly according to one aspect of the present disclosure.

With reference to FIG. 7, additional embodiments of bushings are shown and indicated as bushings 22B, 22C and 22D. Each of bushings 22B-22D may include a head 108, at least one wear indicator groove 110, a least one wear ring 112, and at least one body 114 having an exterior 116 and an interior 118. Bushings 22B through 22D may differ from bushing 22A in the size and configuration thereof but not in the operation thereof, as discussed further below. Specifically, bushing 22B may have a head 108 with a height H5 and a body 114 with a height H6, which may be less than height H5. Height H5 of bushing 22B may be greater than height H1 of bushing 22A and may be configured for turning a slightly larger diameter blank, such as blank 18A, for use as a cap for certain pen types and/or pen kits. Other than the size difference, bushing 22B may be substantially similar to bushing 22A in all other aspects.

Bushing 22C may differ from bushings 22A and 22B in that it may be a two-sided or two-directional bushing having a first side 122, which is shown oriented to the left in FIG. 7 and opposite bushing 22B, and a second side 124 shown oriented to the right and opposite bushing 22D. First side 122 may be sized and configured substantially similarly or identically to bushing 22B but may be a mirror image thereof to serve as the opposite bushing 22 on the opposite side of blank 18A for use with turning a cap of a pen. Second side 124 may be sized differently for turning a barrel from blank 18B, as described further below. In regards to that aspect, first side 122 may have head 108 with height H5 and a body 114 with height H6 which are equal to heights H5 and H6 of bushing 22B. Second side may have a head 108 with height H7 and a body 114 with height H8, which may be smaller than height H5 and H6, respectively. First side 122 may be joined with second side 124 at an intersection of the heads 108 thereof as depicted in FIG. 7.

Bushing 22D may be opposite second side 124 of bushing 22C but may be generally configured and sized to compliment second side 124 of bushing 22C to serve as the opposite bushing for turning a barrel of an associated pen kit from blank 18B, as discussed further below. Bushing 22D may differ in that head 108 thereof may be slightly smaller than head 108 of bushing 22C to provide a slight taper to blank 18C to facilitate engagement with a cap formed from blank 18B. Specifically, head 108 of bushing 22D may have a height H9 that is slightly smaller than height H8 of bushing 22C, but may have a body 114 with a height H8 that is equal to height H8 of body 114 of bushing 22C. these slightly altered dimensions may provide for the aforementioned taper.

Figure 8:
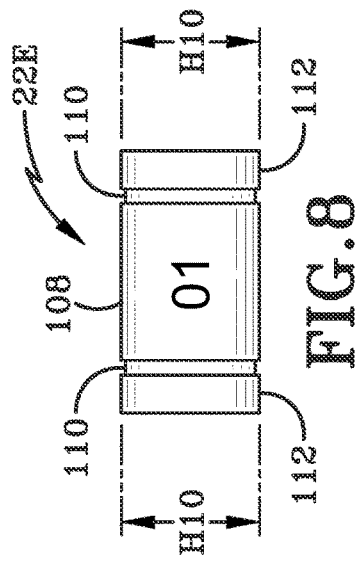
FIG. 8 is a front elevation plan view of a fifth embodiment of a bushing for a turning assembly according to one aspect of the present disclosure.

With reference to FIG. 8, another alternative embodiment of bushing 22 is shown and generally indicated as bushing 22E. Bushing 22E may include a central head portion 108 with a pair of wear indicator grooves 110 and wear rings 112 disposed on either side thereof. Bushing 22E may exclude body 114 but still include an exterior 116 and an interior through opening 118 having a diameter D2 for slidable engagement with mandrel shaft 20. Bushing 22E may be configured for use in turning certain types of pen kits and/or mechanical pencil kits, as discussed further herein.

Having thus described the elements and components of turning assembly 10, first the assemblage and then the operation thereof will now be discussed.

With reference to FIGS. 9A and 9B, the assemblage of turning assembly 10 will now be described, first with reference to head stock assembly 12. As seen in FIG. 9A, the body 26 of head stock assembly 12 is inserted into the head stock 126 of a lathe with the collar 42 and front portion 46 extending therefrom. Mandrel shaft 20 may be inserted into and through the interior 36 of cap 24 and into the interior 56 of body 26 of head stock assembly 12. The insertion of mandrel shaft 20 may serve to center mandrel shaft 20 along Axis A, as previously discussed herein, and may cause mandrel shaft 20 to extend through all components of head stock assembly 12 in the direction of arrows AA indicated in FIGS. 9A and 9B.

Once mandrel shaft 20 is inserted into position and centered within body 26 of head stock assembly 12, cap 24 may be moved in the direction AA and then rotated to engage the internal threads 38 thereof with the external threads 52 of front portion 46 of body 26. As cap 24 is rotated in the direction indicated by arrow BA in FIG. 9B, the cap 24 will be pulled tightly onto front portion 46 of body 26 thereby causing the arms 48 to interact with tapered interior surface 31 of cap 24 to be slightly compressed towards the mandrel shaft 20, thus securing mandrel shaft 20 within the head stock assembly 12. The abutment of collars 28 and 42 of caps 24 and body 26, respectively, may prevent over-rotation of cap 24, which may then further prevent overtightening of the collet formed front portion 46, thus preventing damage to mandrel shaft 20 while allowing the collet to maintain a secure grip thereon. If necessary or desired, cap 24 may be rotated using a wrench or other similar tool to grip nut portion 30. Similarly, if necessary or desired, body 26 may be held in position while rotating cap by employing a wrench or other similar tool to grip flat surface(s) 44.

Figure 9C:
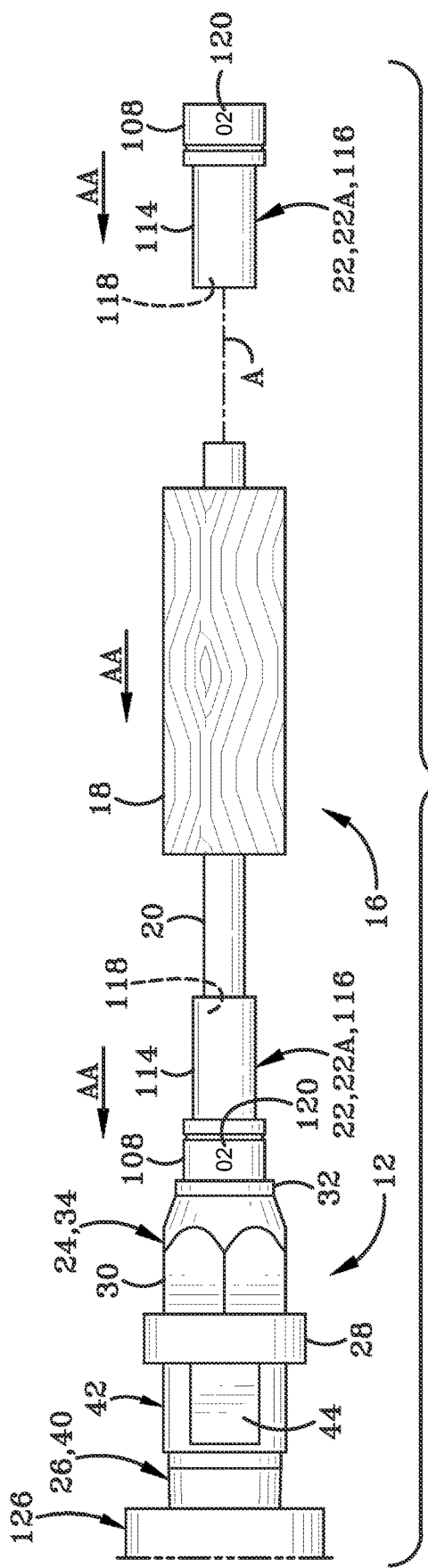
FIG. 9C is a front elevation operational view of a turning assembly showing a second intermediate step in the assemblage thereof according to one aspect of the present disclosure.

With reference FIG. 9C, the assembly of turning assembly 10 is further described as used with bushing 22A and a single blank 18; however, it will be understood that similar assembly steps may be undertaken utilizing other embodiments of bushing 22 and/or different numbers, sizes, and/or configurations of blanks 18 (such as blanks 18A and 18B) as dictated by the specific pen kit being turned. Accordingly, it will be understood that the steps described herein are equally applicable across all potential embodiments of bushing 22 unless specifically stated otherwise.

With continued reference to FIG. 9C, once head stock assembly 12 is secured within head stock 126 of the lathe and cap 24 is securely engaged with body 26 thereof, a bushing 22 may be slid along mandrel shaft 20 in the direction of arrows AA until head 108 thereof abuts against tip 32 of cap 24. A blank 18 may then be slid along mandrel shaft 20 and aligned with body 114 of bushing 22 such that body 114 may extend into the interior of blank 18 to securely position and center blank 18 on the mandrel shaft for even rotation about Axis A. With blank 18 securely inserted on the bushing 22, a second bushing 22 may be inserted behind blank 18 such that the body 114 thereof may be inserted into an opposite side of blank 18, again securing and centering blank 18 about mandrel shaft 20. The placement of bushings 22 and blank 18 on mandrel shaft 20 may thereby constitute the assemblage of turning portion 16 of turning assembly 10.

Figure 9D:
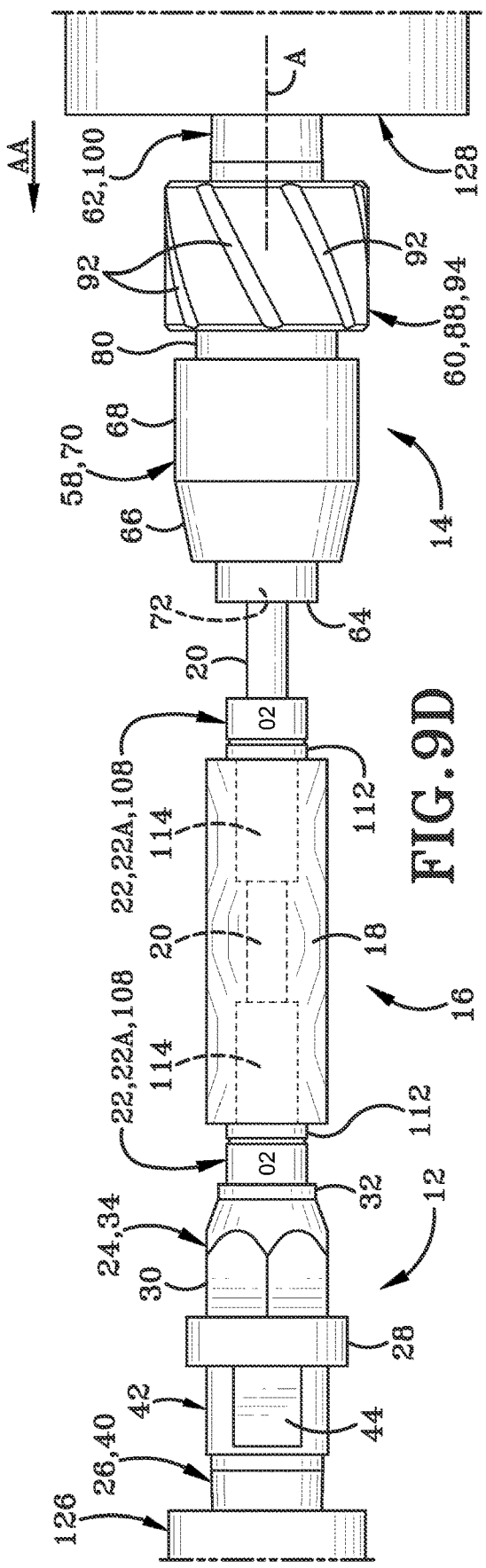
FIG. 9D is a front elevation operational view of a turning assembly showing a third intermediate step in the assemblage thereof according to one aspect of the present disclosure.
Figure 9E:
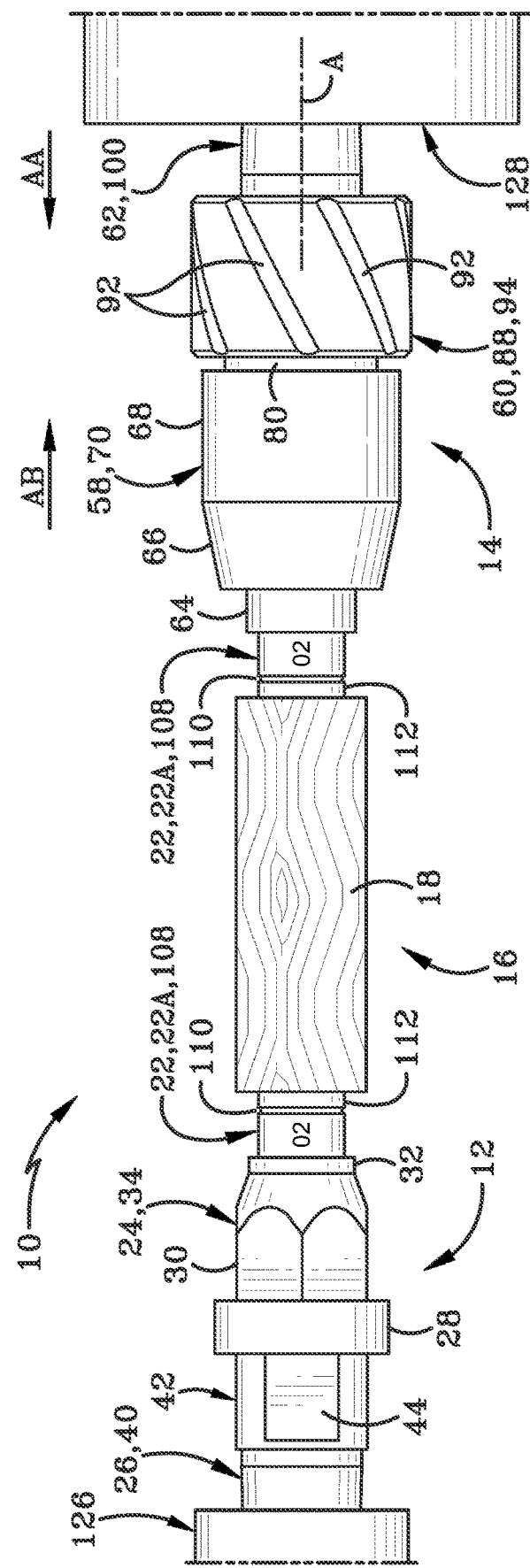
FIG. 9E is a front elevation operational view of a turning assembly showing a final intermediate step in the assemblage thereof according to one aspect of the present disclosure.

With reference to FIGS. 9D and 9E, with head stock assembly 12 and turning section 16 fully assembled, tail stock assembly 14 may then be assembled and engaged therewith. Specifically, rear portion 100 may be first inserted into tail stock 128 of the lathe having bearing assembly 60 and nose cone 58 already connected thereto. Tail stock assembly 14 may then engage the mandrel shaft 20 by moving the tail stock 128 and tail stock assembly 14 as a whole towards the head stock in the direction of arrow AA in FIG. 9D to allow mandrel shaft 20 to slidably engage with the components of tail stock assembly 14.

As depicted in FIG. 9D, front portion 74 of bearing assembly 60 may be engaged with nose cone 58 but not fully inserted therein as to not cause the collet formed by arms 76 and slots 78 of front portion 74 to grip mandrel shaft 20 while tail stock assembly 14 is being moved into position. As tail stock 128 continues to move towards head stock 126 in the direction of arrow AA, tip 64 of nose cone 58 will contact body 108 of bushing 22, as depicted in FIG. 9E. At this point, tail stock 128 may continue to be advanced towards head stock 126 in the direction of arrow AA, thereby causing nose cone 58 to be pushed away from the head stock 126 in the direction of arrow AB in FIG. 9E. Movement of nose cone 58 in the direction of arrow AB may further cause nose cone 58 to fully engage front portion 74 of bearing assembly 60. The collet formed from arms 76 of front portion 74 may then engage tapered inner surface 67 of nose cone 58, thereby causing arms 76 to flex and grip mandrel shaft 20, thus locking mandrel shaft 20 in place and preventing unintended release thereof during operation of the lathe.

With reference now to FIG. 10-10B, a cross section of turning assembly 10 in the fully assembled configuration is shown with mandrel shaft 20 locked in position by the collet formed by front portion 46 of head stock assembly body 26 and the collet formed by front portion 74 of bearing assembly 60 securely gripping mandrel shaft in place. In this fully assembled condition, the through openings defined through interiors 36, 56 72, 106, and 118 are aligned along Axis A, which, as shown in FIG. 10A and FIG. 10B, may again define the rotational axis of the mandrel shaft. In particular, Axis A is shown bisecting mandrel shaft 20 longitudinally, indicating that mandrel shaft 20 is properly centered along the rotational Axis A to prevent defects or damage to blank 18 during the turning process.

As discussed previously herein, the assemblage of turning assembly 10 may be substantially similar for all embodiments of bushings 22, including bushings 22B through 22D except that it will be understood that the assemblage of turning section 16 may include placing bushing 22B followed by blank 18A. Then, bushings 22B and 22C may be placed with blank 18B and bushing 22D to follow. Turning assembly 10 may be best seen in this configuration in FIG. 1B.

With reference to FIG. 11, when utilizing bushing 22E, the assembly may differ only in that bushing 22E may engage the exterior of blank 18 and not be inserted into the interior thereof. For such configured pen kits, the interior of blank 18 may be sized to fit mandrel shaft 20 thereby precluding the ability to insert a body 114 of a bushing 22 therein. Thus, bushing 22E may be utilized between head stock assembly 12 and one side of the blank 18 and also between tail stock assembly 14 and the opposite side of blank 18. FIG. 11 shows the tail stock assembly 14 side of turning assembly using bushing 22E; however, it will be understood that head stock assembly 12 may be similarly arranged when used with bushing 22E.

Figure 12A:
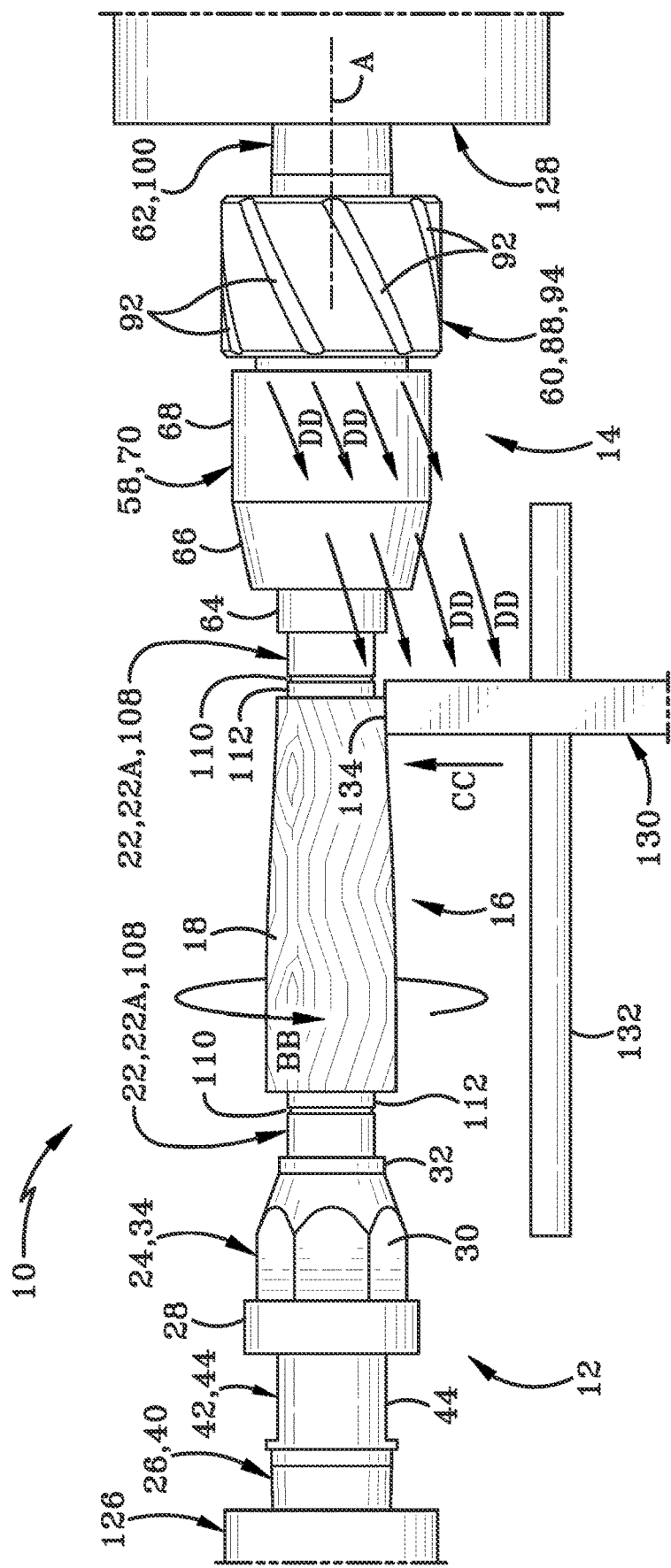
FIG. 12A is a top plan operational view of a turning assembly according to one aspect of the present disclosure.
Figure 12B:
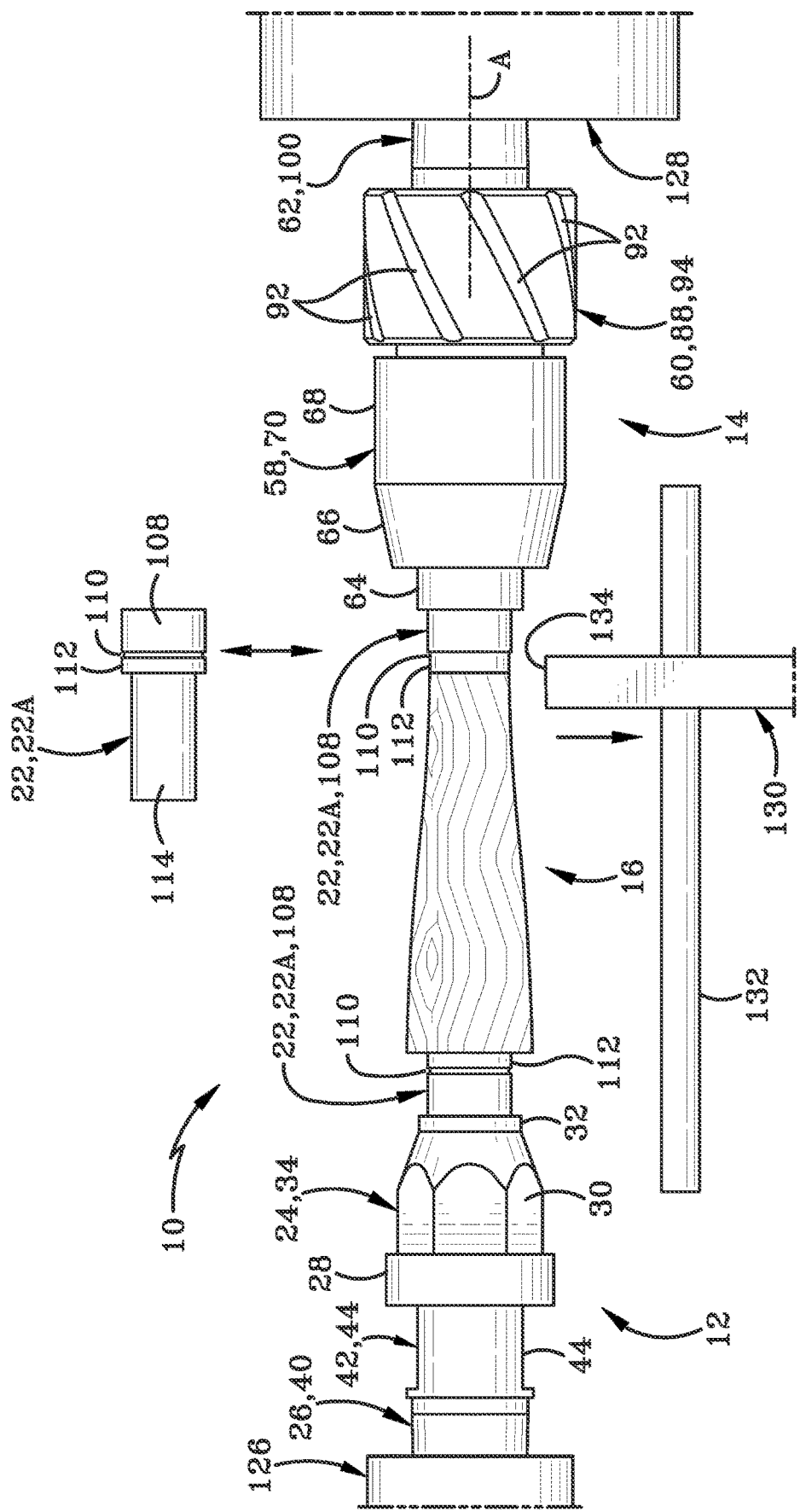
FIG. 12B is a top plan operational view of a turning assembly and replacement bushing therefor according to one aspect of the present disclosure.

With reference now to FIGS. 12A and 12B, the turning operation of a turning assembly 10 having a single blank 18 connected thereto will now be described along with the benefits provided by the use of turning assembly 10.

With reference to FIG. 12A, the turning operation will be described having already placed turning assembly 10 into the proper configuration for turning a single blank 18 according to the assemblage steps discussed herein. In this example, a single blank 18 is being turned utilizing the first embodiment of bushing 22A; however, it will be understood that the turning process may be similar or substantially identical regardless of the specific kit, blanks (i.e. blanks 18A, 18B, or otherwise), and/or bushings 22 being used. Accordingly, it will be further understood that the turning process as described herein is equally applicable across all embodiments unless specifically stated otherwise.

With turning assembly 10 thus configured for turning a single blank 18, the lathe may be powered on, thereby causing the entire turning assembly 10, including blank 18, to rotate in the direction of arrow BB. As the turning assembly 10 and blank 18 are rotated, a lathe tool 130 may be applied to the blank 18 to turn the blank 18 into the desired end form according to standard lathe techniques. Specifically, lathe tool 130 may be operated using a tool rest 132 and may be moved in the direction of arrow CC, such that a cutting surface 134 of the lathe tool 130 may engage blank 18 to shape and form the blank 18 into the desired configuration.

As the turning assembly rotates, the angled channels 92 defined in the exterior 94 of bearing assembly 60 may cause air to be displaced and directed towards the lathe tool 130 in the direction of arrows DD in FIG. 12A. This air movement over lathe tool 130, and particularly over cutting edge 134 thereof, has been shown to decrease the operating temperature of lathe tool 130 by as much as nine percent, resulting in more efficient turning of blanks 18 when using turning assembly 10. This provides for more efficient turning but may also provide the benefits of reduced chance of burning, scarring, or other damage to blanks 18 during the turning process.

With reference now to FIG. 12B, as blank 18 is being turned, cutting edge 134 of lathe tool 130 may partially contact the wear ring 112 of bushing 22 (shown therein as bushing 22A, but equally applicable to all embodiments of bushings 22), which may provide a guide to turn the blank 18 to the proper dimension. Put another way, the blank 18 may be turned with turning assembly 10 until the outer surface of the blank is substantially level with the wear rings 112 of the bushings 22. Over time, the repeated use and contact with cutting edge of 134 of lathe tool 130 may cause the wear ring 112 to be reduced in size. Once the wear ring 112 is reduced to the point of being level with the wear indicator groove 110, the bushing 22 may be replaced with a new bushing 22 having an intact wear ring 112.

Specifically, as previously discussed herein, the height H4 of wear ring 112 relative to the height H3 of the wear indicator groove 110 provides the maximum wear amount for wear ring 112, which may further define a low end tolerance for that particular bushing 22. Put another way, when the wear ring 112 is reduced by height H4 and is now level with the wear indicator groove 110, any further turning of blank 18 and/or bushing 22 is below the proper tolerance for that particular pen kit and is likely to cause damage to blank 18 and/or premature wear in the pen configured therefrom.

Accordingly, where a wear ring 112 of a bushing 22 is reduced to that point, the lathe may be stopped and the turning assembly may be disassembled by reversing the assemblage steps previously discussed herein until the bushing 22 that needs replaced may be removed from mandrel shaft 20 and a new bushing 22 with an intact wear ring 112 may be placed thereon, before reassembling the turning assembly 10 according to the steps provided herein and then continuing with the turning process.

Once the blank 18 is turned to the desired shape and size, and is substantially finished with the turning process, turning assembly 10 may be disassembled to remove the blank from mandrel shaft 20 for later assembly with the pen kit, as dictated by the desired implementation.

It will be understood, as described herein, that the turning assembly 10 may be utilized for turning pen kits and/or blanks 18 for pen kits; however, it will be further understood that turning assembly 10 may be utilized to turn other products, product components, or the like as desired and need not be used exclusively for turning blanks 18 for pen kits. Further, as previously described herein, bushings 22 may include an engraving 120 indicating that particular bushing 22's compatibility with specific pen kits; however, bushings 22 may be chosen by other means as dictated by the desired implementation. According to one example, a bushing 22 may be measured and chosen based on size as opposed to any engravings or markings thereon. It will be further understood that these engravings 120 may be omitted and instead bushings 26 may be marked or identified through other means, as desired.

As discussed herein, certain advantages may be provided by utilizing turning assembly 10 for turning blanks 18 for pen kits or the like. These advantages may include an easier and more efficient assembly and set up, more consistent and accurate centering of mandrel shaft 20, reduced errors and/or damage to blanks 18 as they are being turned, lower operating temperature for a lathe tool 130, and visual and physical indicators of wear tolerance provided by bushings 22 having wear indicator grooves 110 and wear rings 112. It will be understood, however, that additional benefits may be provided or realized and alternatively the use of turning assembly 10 may not always provide all of the enumerative benefits described herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of turning a blank comprising:
    inserting a body of a head stock assembly into a head stock of a lathe;
    inserting at least a portion of a mandrel shaft into a through opening defined in the head stock assembly;
    securing the portion of the mandrel shaft within the head stock assembly in place with a collet formed from a front portion of the head stock assembly body and a cap threadably engaged therewith;
    positioning a first bushing on the mandrel shaft with a head thereof abutting the cap of the head stock assembly;
    engaging a blank with a body of the first bushing;
    positioning a second bushing on the mandrel shaft with a body thereof engaged with the blank opposite the first bushing;
    moving a tail stock assembly engaged with a tail stock of the lathe from a first position wherein the mandrel shaft is exterior of a through opening defined in the tail stock assembly to a second position wherein at least a portion of the mandrel shaft is inserted within the through opening defined in the tail stock assembly and a nose cone of the tail stock assembly is abutting a body of the second bushing;
    securing the portion of the mandrel shaft within the tail stock assembly in place with a collet formed from a front portion of a bearing assembly of the tail stock assembly and the nose cone of the tail stock assembly;
    rotating the turning assembly with the lathe; and
    turning the blank with at least one lathe tool.

2. The method of claim 1 wherein the mandrel shaft is centered within the head stock assembly, tail stock assembly, and blank.

3. The method of claim 2 wherein the mandrel shaft defines a longitudinal axis of rotation of the turning assembly.

4. The method of claim 1 further comprising:
    positioning a third bushing on the mandrel shaft adjacent the body of the second bushing;
    engaging a second blank with a body of the third bushing; and
    positioning a fourth bushing on the mandrel shaft with a body thereof engaged with the second blank opposite the third bushing; and
    moving the tail stock assembly from the first position to a third position wherein the at least a portion of the mandrel shaft is inserted within the through opening defined in the tail stock assembly and the nose cone of the tail stock assembly is abutting a body of the fourth bushing, prior to securing the portion of the mandrel shaft within the tail stock assembly in place.

5. The method of claim 4 wherein the first bushing and second bushing are substantially identical in diameter and are larger in diameter than the third bushing.

6. The method of claim 5 wherein the fourth bushing is smaller in diameter than the third bushing.

7. The method of claim 1 further comprising:
turning the blank until an outer diameter thereof is substantially level with a wear ring of one or both of the first bushing and the second bushing.

8. The method of claim 7 further comprising:
replacing the first bushing when the wear ring thereof is reduced in diameter to be level with a wear indicator groove defined in the body of the first bushing; and
replacing the second bushing when the wear ring thereof is reduced in diameter to be level with a wear indicator groove defined in the body of the second bushing.

9. The method of claim 1 further comprising:
directing air flow from a housing of bearing assembly of the tail stock assembly towards the at least one lathe tool via one or more angled channels defined in an exterior surface of the bearing housing.

\* \* \* \* \*